(12) United States Patent
Cheriton

(10) Patent No.: US 8,146,148 B2
(45) Date of Patent: Mar. 27, 2012

(54) TUNNELED SECURITY GROUPS

(75) Inventor: David R. Cheriton, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1006 days.

(21) Appl. No.: 10/716,656

(22) Filed: Nov. 19, 2003

(65) Prior Publication Data

US 2005/0129019 A1    Jun. 16, 2005

(51) Int. Cl.
*G06F 9/34* (2006.01)
(52) U.S. Cl. ......................................................... 726/15
(58) Field of Classification Search .................... 726/15
See application file for complete search history.

(56) References Cited

U.S. PATENT DOCUMENTS

| | | | |
|---|---|---|---|
| 6,438,612 B1* | 8/2002 | Ylonen et al. | 709/249 |
| 6,526,056 B1* | 2/2003 | Rekhter et al. | 370/392 |
| 6,643,776 B1* | 11/2003 | Boden et al. | 726/15 |
| 6,693,878 B1* | 2/2004 | Daruwalla et al. | 370/235 |
| 6,701,437 B1* | 3/2004 | Hoke et al. | 726/15 |
| 6,823,462 B1* | 11/2004 | Cheng et al. | 726/15 |
| 7,028,332 B1* | 4/2006 | Jason, Jr. | 726/1 |
| 2002/0002687 A1* | 1/2002 | Chantrain et al. | 713/201 |
| 2002/0032773 A1* | 3/2002 | Jiang | 709/225 |
| 2002/0126667 A1* | 9/2002 | Oguchi | 370/389 |
| 2002/0144144 A1* | 10/2002 | Weiss et al. | 713/201 |
| 2003/0041266 A1* | 2/2003 | Ke et al. | 713/201 |
| 2004/0088542 A1* | 5/2004 | Daude et al. | 713/156 |
| 2004/0202171 A1* | 10/2004 | Hama | 370/395.1 |
| 2004/0225895 A1* | 11/2004 | Mukherjee et al. | 713/201 |

FOREIGN PATENT DOCUMENTS

WO   WO 00/78004 A   12/2000
WO   WO 03/003660 A   1/2003

OTHER PUBLICATIONS

Cheriton (David R. Cheriton and Willy Zwaenepoel, Distributed Process Groups in the V Kernel, ACM Transactions on Computer systems, vol. 3, No. 2, May 1985, p. 77-107).*
B. Gleeson, et al.; *A Framework for IP Based Virtual Private Networks*; Lucent Technologies; Network Working Group; Feb. 2000; pp. 1-62.
P. Srisuresh; *Secure Remote Access with L2TP*; Campio Communications; Network Working Group; Aug. 2000; pp. 1-19.

* cited by examiner

*Primary Examiner* — Peter Poltorak
(74) *Attorney, Agent, or Firm* — Campbell Stephenson LLP

(57) ABSTRACT

A method for providing security groups based on the use of tunneling is disclosed. The method includes assigning a security group identifier (SGI) to a packet and classifying the packet based on the packet's SGI.

32 Claims, 12 Drawing Sheets

TUNNELED SECURITY GROUPS

BACKGROUND OF THE INVENTION

1. Field of the Invention

This invention relates to the field of information networks, and more particularly relates to a method and apparatus for providing security groups based on the use of tunneling.

2. Description of the Related Art

Flexible network access technologies such as wireless, Dynamic Host Configuration Protocol (DHCP), virtual private network (VPN) gateways and the like allow users access to a given protected network from a variety of access or entry points. This is true of all manner of networks, including enterprise networks, service provider networks and the like. At the same time, the security afforded while providing such access is of increasing concern. Technologies based on Remote Authentication Dial-In User Service (RADIUS), Terminal Access Controller Access Control System (TACACS), the DIAMETER protocol and other protocols allow a user to be authenticated upon entry to the network. However, the network access that a user is permitted is conventionally based on the group(s) to which the user belongs, the role(s) assigned to the user by the enterprise, the privilege(s) the user has as an ISP customer or similar criteria.

FIG. 1 is a block diagram illustrating a network 100 of the prior art and the components thereof, in which such authentication protocols are employed to authenticate users. Network 100 includes an internetwork 110 that a number of clients (depicted as clients 112, 114 and 116) access in order to gain access to a server 120. Clients 112, 114 and 116 access internetwork 110 via a switch 130, which is, in turn, coupled to an ingress router 140. Ingress router 140, in providing access to internetwork 110, is communicatively coupled to an egress router 150, which, in turn, is coupled to server 120. Note that, for the sake of simplicity, the paths between ingress router 140 and egress router 150 through internetwork 110 do not explicitly depict the routers and/or other network devices that are typically interspersed along such paths. As is apparent from FIG. 1, each of clients 112, 114 and 116 can communicate with server 120 over a separate network path, or can use the same path through network 100.

These network paths, while they may traverse some or all of the same network devices (i.e., physical segments), the paths are conceptually separate (e.g., can be viewed as separate virtual paths), and are controlled separately using, for example, access control lists (ACLs). Conventionally, constraints upon access enjoyed by users, such as those that might access network 100, have been enforced by ACLs, which are used to process packets and so control such network traffic. For scalability and manageability, conventional ACLs require the mapping of a user host address (as the source of the given packet(s); for example, an internet protocol (IP) address) to be relatively static.

It would appear that ACLs in various parts of the network would have to be updated each time a user authenticated to the network to add rules associated with the source IP address assigned to this user's host, and the rules would be specific to that user, a huge increase in the number of ACLs and the rate at which they would have to be updated. Moreover, because platforms using content-addressable memories (CAMs) to implement ACLs require recompiling of some or all of the ACLs when any change is made, the increases in processing cost can be quite severe, approaching a quadratic in the number of users. Finally, because the ACLs controlling access to a service are typically at the "other side" of the network from the user (namely the protecting egress router connecting to a particular server or set of servers), communication is required from ingress access point to each potential egress router upon each new user authentication. Given the foregoing, particularly in light of the increasingly flexible access that is required now and will be required in the future, as well as the limited size and availability of IP addresses to organizations, it is generally infeasible to rely on such ACL-based solutions.

What is required, then, is a mechanism that allows for the communication of identifying information regarding the group(s) or role(s) associated with a host, without the need to alter packet formats to support this communication. Preferably, such an approach should employ a standardized packet format without requiring any additional fields for communicating the requisite information beyond those already provided in that standardized format. Also preferably, such an approach should be compatible with existing networking equipment already deployed and not require changes to that networking equipment.

SUMMARY

In one embodiment, a network device is disclosed. The network device includes a tunnel classification stage. In certain aspects of such embodiments, the network device's tunnel classification stage includes a packet processing section that is configured to classifying a packet based on a security group identifier (SGI) of the packet. In other aspects of such embodiments, the tunnel classification stage includes a security group identifier identification unit that is coupled to said packet processing section, and a tunnel classification unit that is coupled to the packet processing section and the security group identifier identification unit.

In another embodiment, a method for providing security groups based on the use of tunneling is disclosed. The method includes assigning a security group identifier (SGI) to a packet and classifying the packet based on the packet's SGI.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and numerous objects, features, and advantages made apparent to those skilled in the art by referencing the accompanying drawings.

The use of the same reference symbols in different drawings indicates similar or identical items.

DETAILED DESCRIPTION OF THE INVENTION

Figure 1:
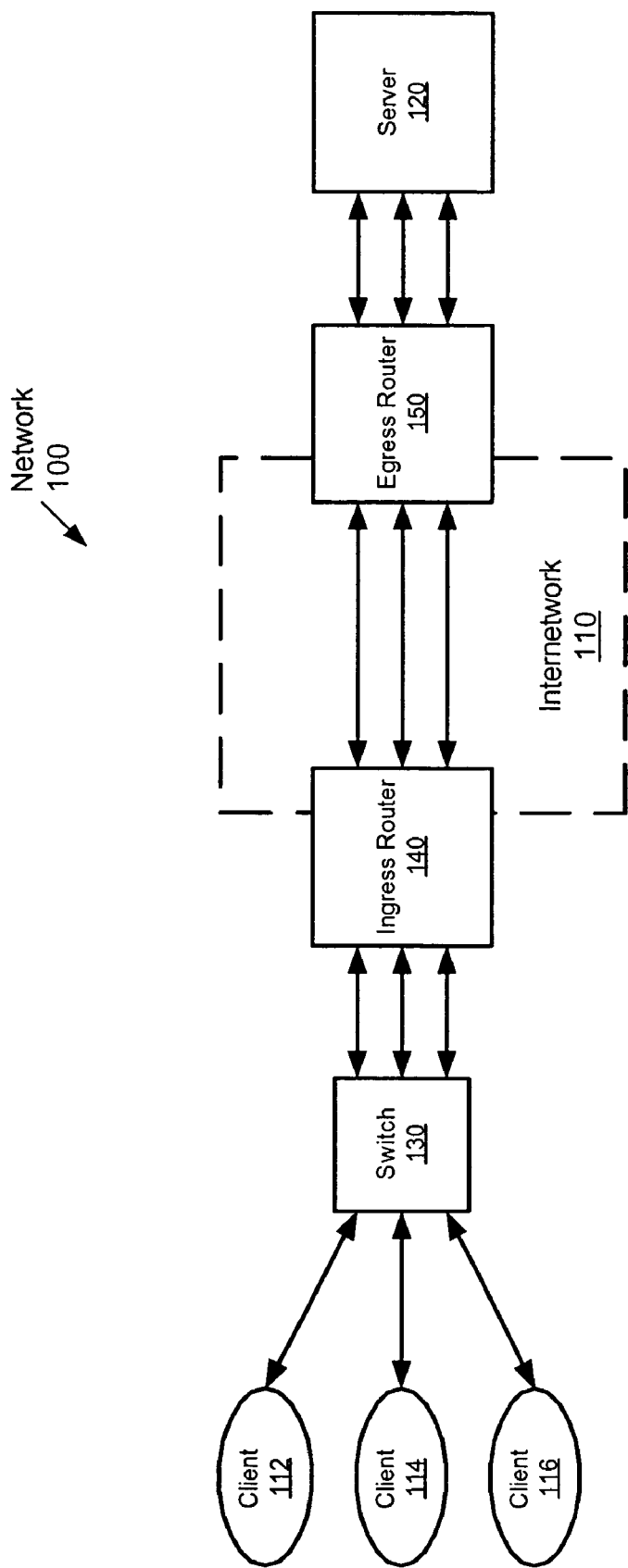
FIG. 1 is a block diagram illustrating a network of the prior art.

The following is intended to provide a detailed description of an example of the invention and should not be taken to be limiting of the invention itself. Rather, any number of variations may fall within the scope of the invention which is defined in the claims following the description.

Introduction

The present invention is a method and apparatus that provides a tunneled security group (TSG) as a way of effectively tagging packets with the logical group or role of the source host to address the aforementioned limitations. In the present invention, each protecting network device (e.g., egress router) advertises its network address (e.g., IP address), range of network addresses handled (e.g., blocks of IP addresses that the network device handles) and identification of tunnel protocol requirements. When a user at an ingress network device (e.g., an ingress router (IR)) assigned to some role or group (referred to as G) attempts to send to a network address handled by protecting egress network device (e.g., an egress router (ER)), IR sets up a tunnel from IR to ER representing traffic associated with G, if one does not already exist. As part of the tunnel setup operations, ER is directed to associate traffic arriving on this tunnel with G. IR can terminate the tunnel when the last user of G disconnects from IR. Alternatively, either IR or ER can terminate the tunnel if the tunnel has been idle for some period of time, thereby reclaiming the resources associated with the tunnel, including the overhead of recurring key refresh that may be required if the tunnel is an encrypted tunnel.

One possible extension to the above, as part of tunnel setup negotiation, is the propagation of the ACL entries that apply to G from ER to IR, such that unacceptable packets can be dropped at the ingress to the security group tunnel (at the IR) rather than on egress (at the ER), after they have traversed (and thus consumed the resources of) the network.

In one embodiment, the present invention is implemented in hardware, in the form of a router. In such a case, each TSG device supports some minimal number of security groups (e.g., 2048). This is the router's internal capacity, and does not appear as a field in any packet header. Thus, network devices can support greatly disparate (and far larger) numbers of security groups and still remain compatible. A security group identifier (SGI) per security group is maintained as an internal-to-switch identifier.

Note that, in a network such as that depicted herein, the dominant communication is from the client edge to one or a few data centers where critical servers are located. Thus, the number of address blocks of protected servers is small, normally less than 10 or so. A modest-scale ingress device for clients is unlikely to have directly connected client hosts in more than 100 groups. Thus 10*100=1000 is a reasonably minimum. Thus, a TSG device according to the present invention provides a solution that can scale to accommodate current networks. Moreover, such a TSG device can support far more tunnels than the minimum. Indeed, a user can upgrade to TSG devices supporting substantially more tunnels, as such a feature is increasingly deployed.

Each TSG device is able to assign an SGI upon packet reception, based on the port/VLAN, source address or tunnel on/through which the packet a received, if received over a tunnel for which the given network device is the endpoint. Typically, an access port provides a default SGI for that port. The layer 2 lookup that is performed can also return an SGI, overriding the per-port value. Moreover, an input ACL lookup can also return an SGI, again optionally overriding the SGI.

Note that an SGI can be viewed as a "virtual port" identifier, and, in such a capacity, is capable of handling identification of both the physical ports and VLAN ports well as virtual ports that represent the endpoint of a tunnel. For example, in one embodiment, such an SGI is capable of identifying physical ports as a subset, so that a network device's classification mechanism can perform takes in this one identifier, rather than two separate identifiers (physical port and SGI).

Each TSG device has a tunnel classification stage (TCS) that uses, for example, the SGI plus destination address of the packet in the classification processing performed on the incoming packet to determine the classification of that packet. For an L2 packet, the SGI is part of the key in the media access control (MAC) layer destination address lookup. For an IP-routed packet, the SGI is part of the key in forwarding information base (FIB) lookup.

Each TSG device can select an egress tunnel based on the result of the TCS, and encapsulate the packet according to the associated tunneling protocol specified by the egress router (assuming the packet is to be tunneled). A variety of standard tunneling protocols are available, and can be used to support network traffic transported according to the present invention. On reception of a packet received via a tunnel (i.e. at the tunnel endpoint), a TSG device is able to de-encapsulate the packet, and use the destination address of the inner header and the SGI associated with the tunnel for the TCS's operations. In such an embodiment, a TSG device can be designed, for example, to support at least 1024 tunnel ingress endpoints and 1024 tunnel egress endpoints. This requires 2048 entries in the TCS (to cover ingress and egress) plus 1024 tunnel rewrite entries.

Note that a TSG device needs to be configurable in order to advertise the address blocks that are restricted to TSG access, using extensions to the intra-domain routing protocol. A TSG device updates its TCS in order to ensure packets addressed to such an address block are tunneled appropriately.

Tunnels can be set up on demand (dynamically) by trapping the first packet to a tunnel to software and setting up the tunnel. This is particularly important with truly secure tunnels because there is overhead associated with keeping keys fresh on every tunnel, active or not. Alternatively, tunnels can be set up as part of the ingress router configuration on boot-up or after reconfiguration. Alternatively, a combination of static and dynamic tunnels can be used.

In addition to addressing the limitations discussed previously, embodiments of the present invention provide a number of advantages, including improved network efficiency (both in terms of resources required and operation), improved security and compatibility with existing standards and equipment. With regard to efficiency, a TSG according to the present invention enjoys a reduction in the number of ACLs required to provide logical group access control. The present invention also reduces the need to update ACLs, while providing the advantages of role- and group-based access control. Furthermore, with the extension to propagate ACLs from egress device to ingress device on tunnel setup, the present invention reduces network resource consumption, particularly with regard to protection from a potential denial-of-service attack.

With regard to security, the present invention employs tunnels that can be encrypted using standard techniques and protocols, providing "edge-to-edge" security on the identification of packets to groups and secure propagation of group-based ACLs. The present invention is also readily compatible with existing standards. A TSG according to the present invention supports logical security groups without introducing a new packet header format, thereby avoiding the problems associated with the standardization of new packet formats and the deployment of switches/routers supporting such new formats. Logically, a tunnel is used to effectively carry the identifier of the sender's security group from the ingress endpoint of the tunnel to the egress endpoint of the tunnel for use in classification at this egress endpoint, effectively (and securely) providing role-based ACLs. Consequently, TSGs can be deployed incrementally by upgrading the edge devices to provide TSG support.

Example of an Apparatus Supporting Tunneled Security Groups

Figure 2:
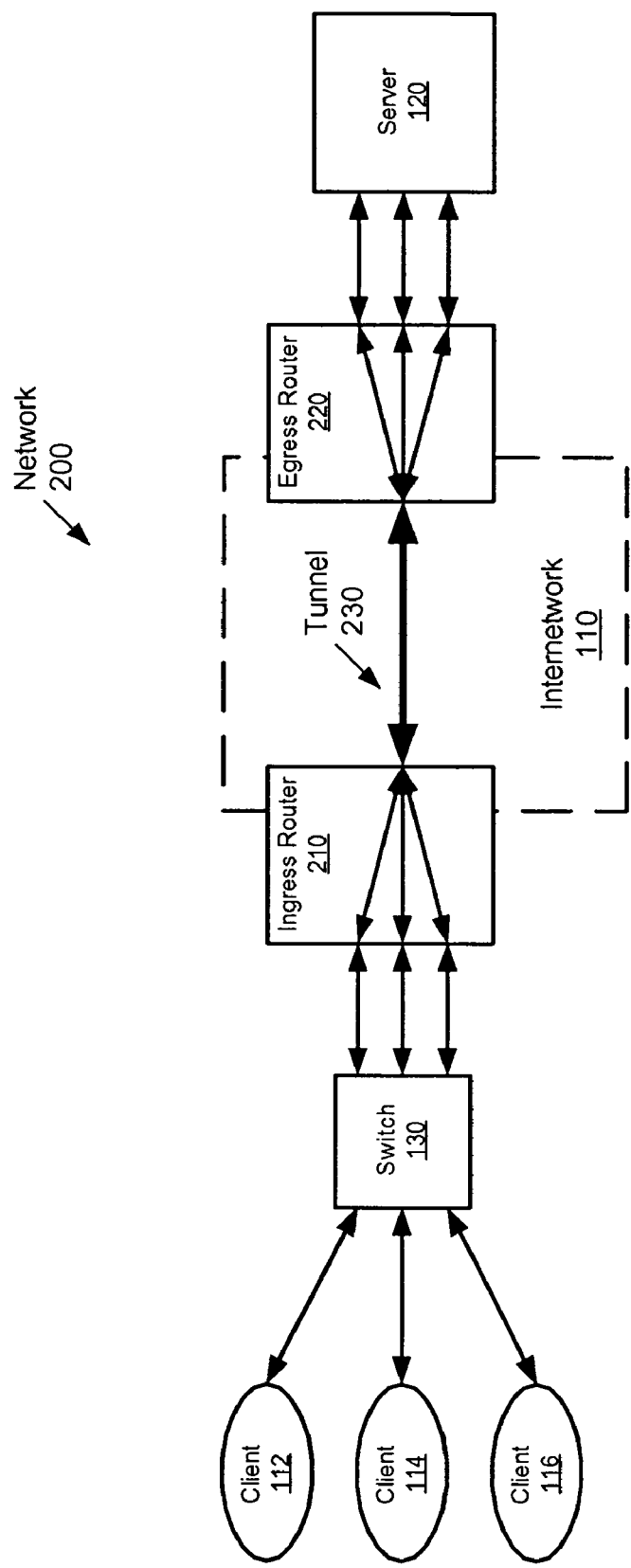
FIG. 2 is a block diagram illustrating a network incorporating embodiments of the present invention.

FIG. 2 is a block diagram illustrating a network 200 incorporating embodiments of the present invention. As before, clients 112, 114 and 116 access server 120, and do so via internetwork 110. Also as before, clients 112, 114 and 116 are coupled to internetwork 110, in part, via switch 130.

However, ingress router 210 and an egress router 220 are configured to aggregate the network traffic between clients 112, 114 and 116, and server 120, and transfer that traffic over a single tunnel, a tunnel 230. In this example, clients 112, 114 and 116 all exist within the same user group. This user group is the user group supported by tunnel 230. Thus, having been identified as supporting the given user group, tunnel 230 supports such network traffic for that user group between ingress router 210 and egress 220 (which, given the user group, is that intended for server 120).

In this case, ingress router 210 and egress router 220 are also configured to identify packets, based on the security group identifier (SGI) of the host from which the given packet(s) originated and the tunnel through which the packet(s) are to be/were conveyed. As noted, a given packet has associated therewith an SGI that identifies the security group to which the host belongs, which can be set statically (e.g., upon authentication, in which the SGI is provided to the appropriate switch as part of the authentication procedure for this particular user), or dynamically (e.g., by the ingress router performing an address-to-SGI translation, based on the host's network address).

For example, when sending a packet received from a host, the ingress router receives the packet, and, using the source address of the host, generates an SGI. The ingress router then determines through which tunnel the packet is to be sent using the destination address. If the ACL for this tunnel has been pushed to the ingress router, the ingress router can also determine if a packet with the given SGI is allowed on the desired tunnel, and process the packet accordingly, based on its classification.

Alternatively, if this determination is to be made at the egress router (i.e., the given ACL has not been pushed to the ingress router), the packet is sent through the appropriate tunnel. Upon receipt, the egress router makes a determination as to whether forwarding the packet to its intended destination is permissible. This can be accomplished, for example, by referring to the appropriate ACL entry (ACE) using the packet's packet flow label (IP source address, IP destination address, ports and protocol type), as well as the packet's SGI.

Figure 3:
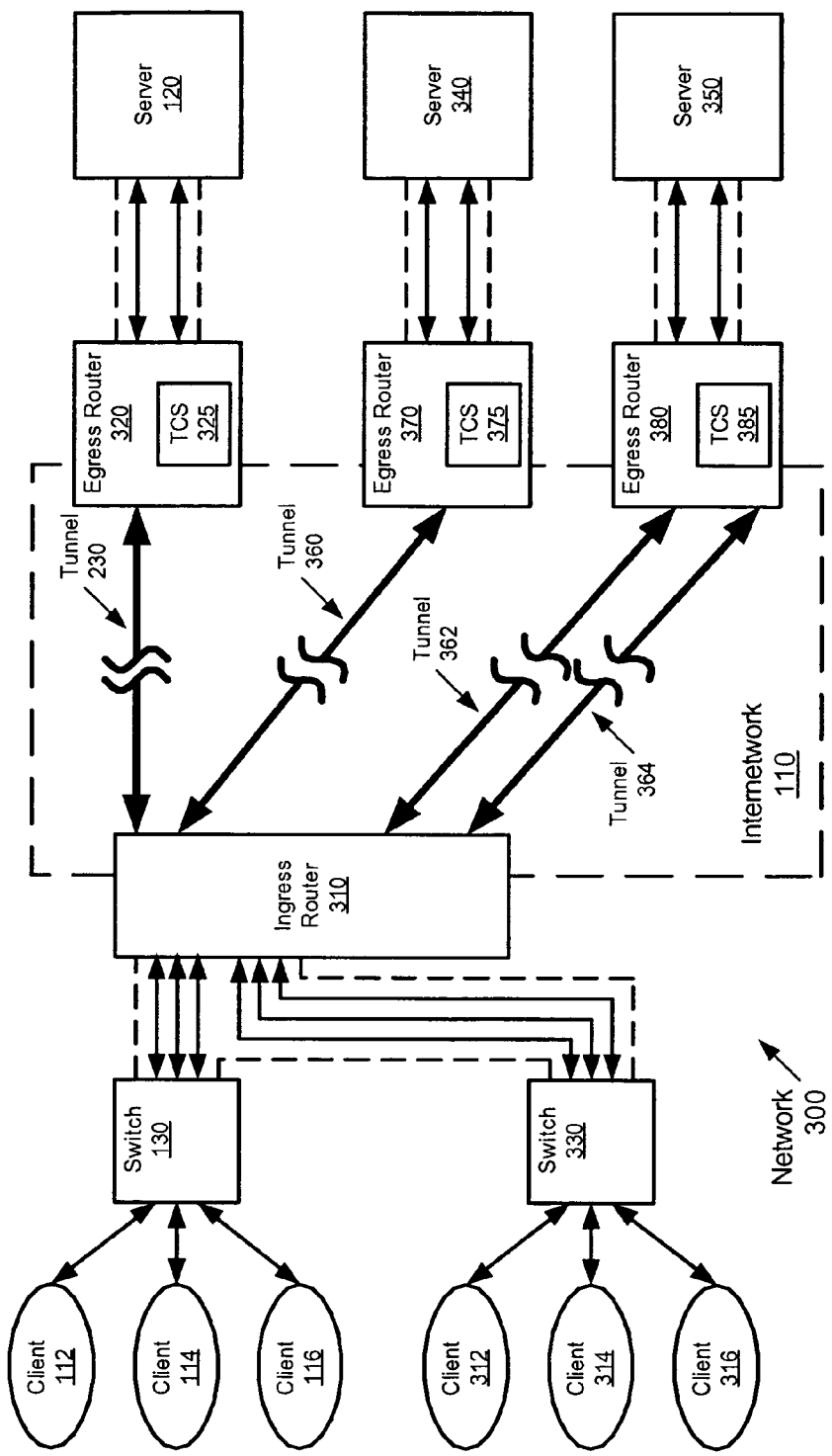
FIG. 3 is a block diagram illustrating in greater detail a more extensive network that incorporates embodiments of the present invention.

FIG. 3 is a block diagram illustrating a network of greater complexity than that depicted in FIG. 2. A network 300 is depicted in FIG. 3 as including clients 112, 114 and 116, which are again coupled via internetwork 110 to server 120. Access to internetwork 110, again via switch 130, is provided by an ingress router 310. Also coupled to ingress router 310 are clients 312, 314 and 316. Clients 112, 114 and 116 access server 120 via switch 130, ingress 310, internetwork 110 and egress router 320. As is apparent from FIG. 3, egress router 320 includes a tunnel classification stage (TCS) 325. As in FIG. 2, network traffic between clients 112, 114 and 116, and server 120 are carried between ingress router 310 and egress router 320 via tunnel 230.

In a similar fashion, clients 312, 314 and 316 communicate with ingress router 310 via a switch 330. Various ones of clients 112, 114, 116, 312, 314 and 316 are able to communicate with not only server 120, but also servers 340 and 350 via tunnels (i.e., tunnels 360, 362, 364 and 366) between ingress router 310, and an egress router 370 (which includes a TCS 375) and an egress router 380 (which includes a TCS 385). Tunnels 230, 360, 362 and 364 are identified by the user group (or user groups) that they support. Typically, the user group(s) supported by a given tunnel depends on the server (e.g., servers 120, 340 and 350) supported by the given tunnel. Clients 112, 114, 116, 312, 314 and 316 each may belong to one or more user groups. Based on this information, ingress router 310 and egress routers 320, 370 and 380 control access to the servers to which they are coupled by permitting or blocking traffic from one or more of the clients over the tunnel for the given user group.

In network 300, clients 112, 114, 116, 312, 314 and 316 are (at least theoretically) able to access any one of servers 120, 340 and 350, so long as the security group to which the given client belongs is allowed to access the given server. That being the case, the paths shown in FIG. 3 can, in fact, represent communications between any one of clients 112, 114, 116, 312, 314 and 316, and any one of servers 120, 340 and 350. The depiction of those paths assumes that, whatever set of combinations the paths shown in FIG. 3 represent, the posited combinations are allowable, based on the SGIs of clients 112, 114, 116, 312, 314 and 316, and the permissions supported by servers 120, 340 and 350 (via the ACLs (or comparable mechanism) resident in either ingress router 310, or appropriate ones of egress routers 325, 370 and 380).

Note that tunnels 230, 360, 362 and 364 are capable of supporting one or more paths therethrough, based on the servers to which the egress router at the terminus of the tunnel is coupled. Thus, if we assume for purposes of example that clients 112 and 114 are to access server 120, such network traffic could traverse tunnel 230 in tandem.

On the other hand, if network traffic were to be supported between clients 314 and 316, and server 350, such network traffic could be conveyed separately over tunnels 362 and 364, respectively. This might be the case where clients 314 and 316 are in different security groups, with each security group being supported by one of tunnels 362 and 364. In that scenario, server 350 would allow access to clients in both such security groups. Alternatively, the flow of network traffic can be supported between clients 314 and 316, and servers 340 and 350, respectively, via tunnels 360 and 362, respectively. In that case, network traffic between client 314 and server 350, and between client 316 and server 340, might be impermissible (based on the security groups of clients 314 and 316). Thus, ingress router 310 might well support any number of tunnels to egress routers 320, 370 and 380, depending on the needs of clients 112, 114, 116, 312, 314 and 316, and permissible access thereby to servers 120, 340 and 350.

Figure 4:
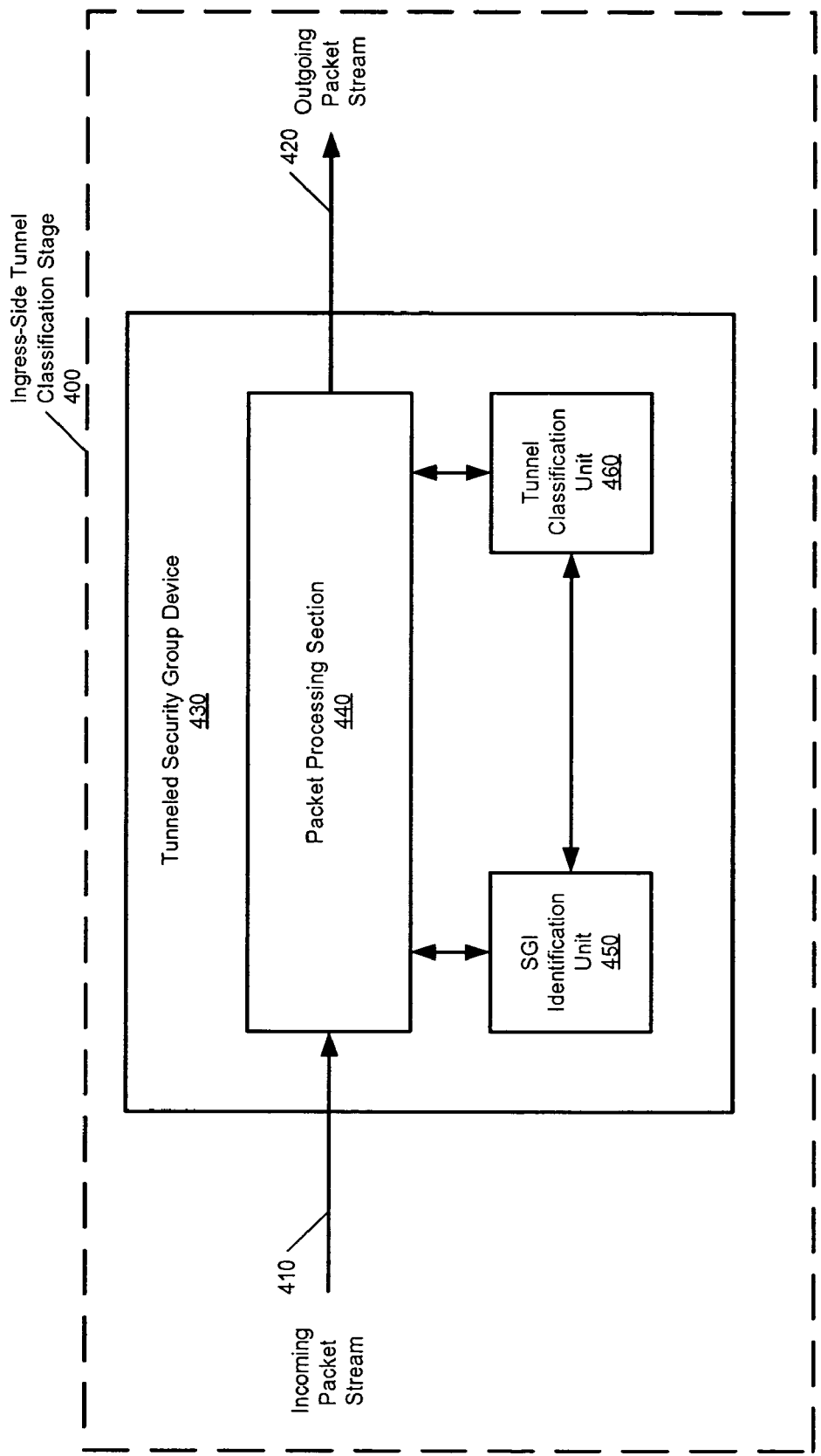
FIG. 4 is a block diagram illustrating a tunnel classification stage (TCS) according to the present invention.

FIG. 4 is a block diagram illustrating a tunnel classification stage (TCS), and more particularly, an ingress-side TCS 400. An network device including TCS 400 (e.g., egress routers 320, 370 and 380) provide an incoming packet stream 410 to TCS 400 from another section of the network device. In turn, TCS 400 provides an outgoing packet stream 420 to other sections of the network device. TCS 400 includes a tunneled security group (TSG) device 430, in which processing based on a packet's security group identifier (SGI) is performed. To that end, TSC device 430 includes a packet processing section 440. Packet processing section 440 performs various operations on the packets of incoming packet stream 410 based on those packets' SGIs.

Supporting this functionality, and coupled to packet processing system 440, is an SGI identification unit 450 and a tunnel classification unit 460. In the processing of packets by packet processing section 440, a packet received by an ingress network device (e.g., ingress router 310), a packet's security group is identified upon receipt by packet processing section 440, by SGI identification unit 450. SGI identification unit 450, having identified the given packet's security group, passes this information to tunnel classification unit 460. Tunnel classification unit 460 determines whether the packet is allowed on the given tunnel using the packet's security group (as provided by SGI identification unit 450) and the tunnel classification of the tunnel on which the packet is to be conveyed (as identified by tunnel classification unit 460). The SGI serves as a virtual input port, as mentioned earlier, and the forwarding of the packet is determined based on both input interface and destination address, as is the case, for instance, with policy-based routing. In the present invention, the decision is with regard to which tunnel the packet is forwarded. The output ACL associated with the tunnel as an output is used to determine whether the packet is transmitted over the selected tunnel or dropped.

Note that, with regard to the embodiments described herein, different components are contained within different other components (e.g., the various elements shown as components of TCS 400). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled" each other to achieve the desired functionality.

Figure 5:
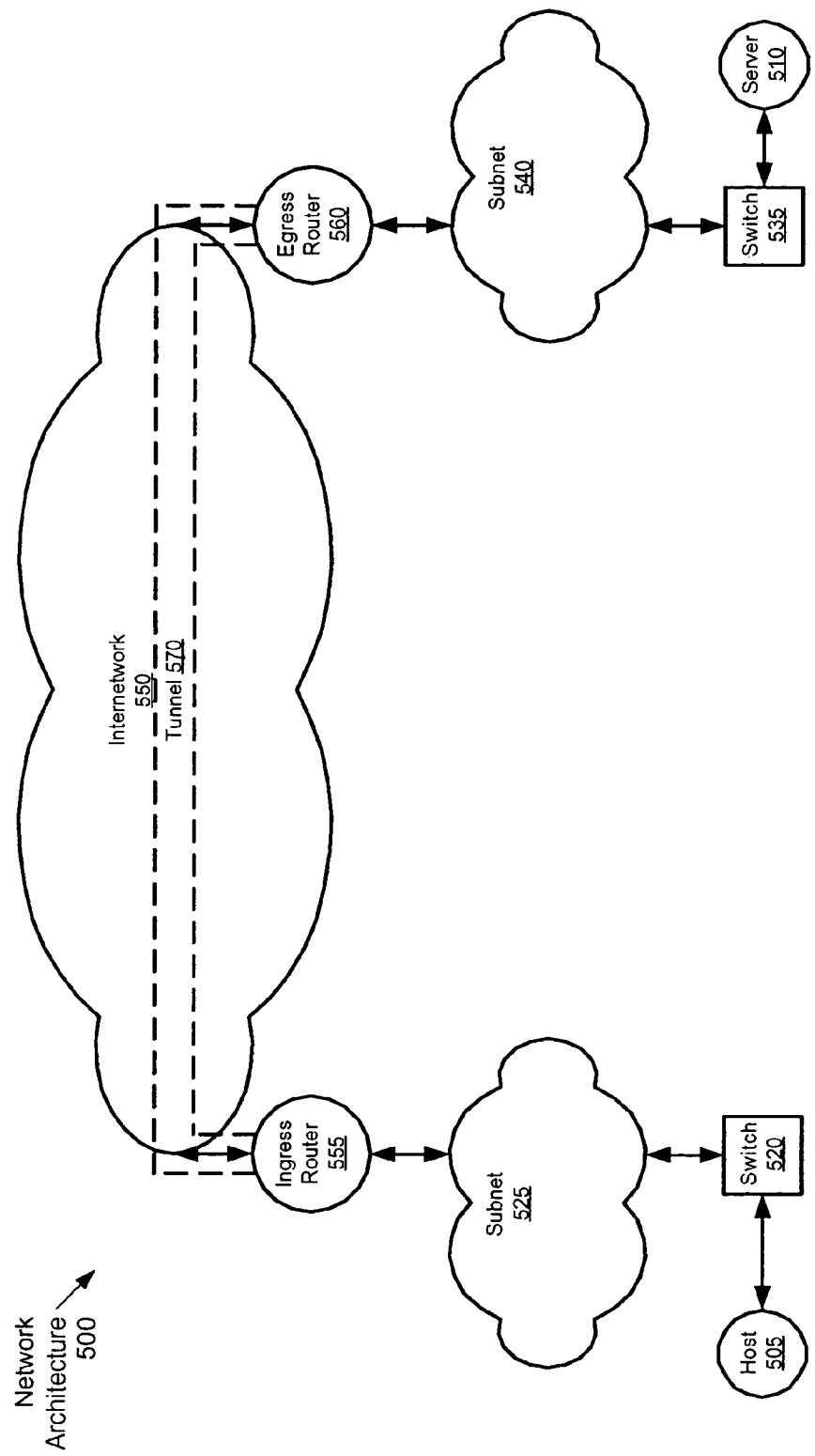
FIG. 5 is a block diagram illustrating in greater detail a network that incorporates embodiments of the present invention.

FIG. 5 is a block diagram illustrating an example of a network architecture 500 that includes a host 505 and a server 510. Host 505 accesses server 510 using a security mechanism of the present invention in the following manner. First, the security group for host 505 is first designated. This can be accomplished when host 505 is authenticated. The authentication function can be handled by an authentication server (not shown), via a switch to which host 505 is coupled (e.g., a switch 520). Switch 520 also provides host 505 access to a sub-net 525.

In a similar manner, server 510 is also authenticated, in this case by an authentication server (not shown), via a switch to which server 510 is coupled (e.g., a switch 535). Switch 535 provides server 510 access to a sub-net 540. Sub-nets 525 and 540 are communicatively coupled to one another via an internetwork 550. Sub-net 525 is coupled to internetwork 550 via an ingress router 555, and similarly, sub-net 540 is coupled to internetwork 550 via an egress router 560.

Also show in FIG. 5 is a tunnel 570. Tunnel 570 provides a virtual path between ingress router 555 and egress router 560, thereby supporting network traffic to one or more of the servers coupled to egress router 560 (e.g., server 510). By identifying a host's packets using the host's security group identifier, and knowing the security group(s) supported by the tunnel (the tunnel classifier), the ingress router has the information needed to make a decision on whether or not to forward the packet through the tunnel.

Security user group information (in the form of a security group identifier) is generated, for example, within ingress router 555. This is used to determine if any of the tunnels available to transport the given packet to its designated destination are allowed to carry a packet belonging to such a security group. For example, if the classification of tunnel 570 indicates that a packet having such an SGI is permitted on tunnel 570, the packet is routed across internetwork 550 via tunnel 570, to egress router 560. If the desired tunnel does not exist, based on the packet's SGI and destination, such a tunnel is created. However, a packet may be dropped because the ACEs on the appropriate tunnel deny this type of packet. Such a determination is normally made based on the fall packet flow label. A packet may also be dropped because the requisite tunnel could not be created for some reason, as described below in connection with FIG. 9.

Figure 6:
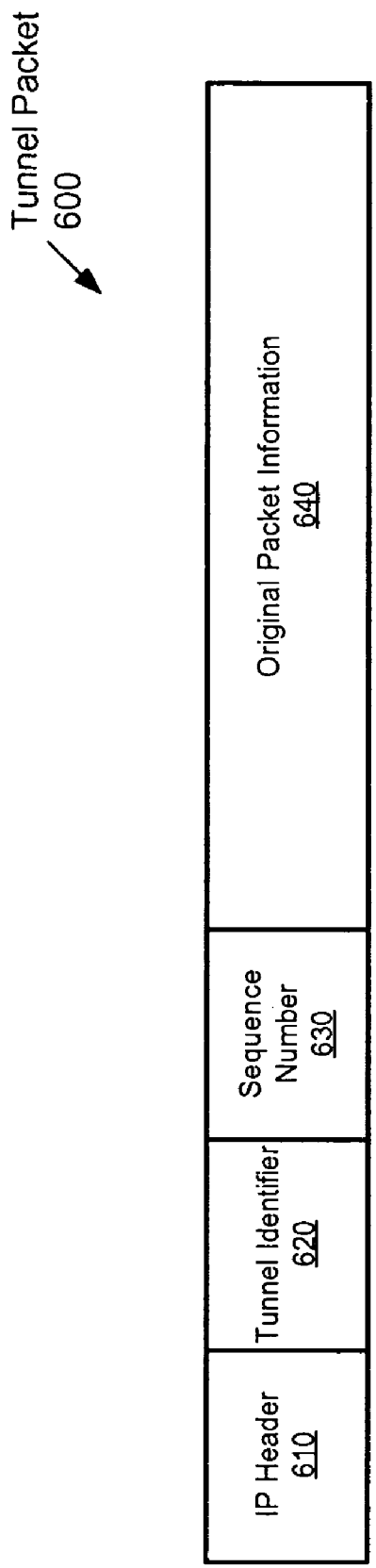
FIG. 6 is a block diagram illustrating a tunnel packet according to embodiments of the present invention.

FIG. 6 is a block diagram illustrating a tunnel packet 600 of the present invention. Tunnel packet 600 is shown in FIG. 6 as including an IP header 610, a tunnel identifier 620, a sequence number 630 and original packet information 640. Note that original packet information 640 is the information originally sent by the host (or server) to the server (or host) with which the host (or server) is in communication. Note that a packet traveling from host to server encounters the same networking structures and operations as a packet traveling from server to host. This is because each must be analyzed and, if appropriate, processed and communicated via the appropriate tunnel through the given internetwork. IP header 610 contains information that allows tunnel packet 600 to travel through the given tunnel. Similarly, tunnel identifier 620 identifies the tunnel through which tunnel packet 600 traverses the internetwork. Sequence number 630 is used to prevent replay attacks, as well as to monitor the apparent level of loss over a given tunnel. Note that, in practice, a tunneling protocol header such as that used in the IP Encapsulating Security Payload (ESP) protocol can be employed, in addition to that depicted in FIG. 6.

Figure 7:
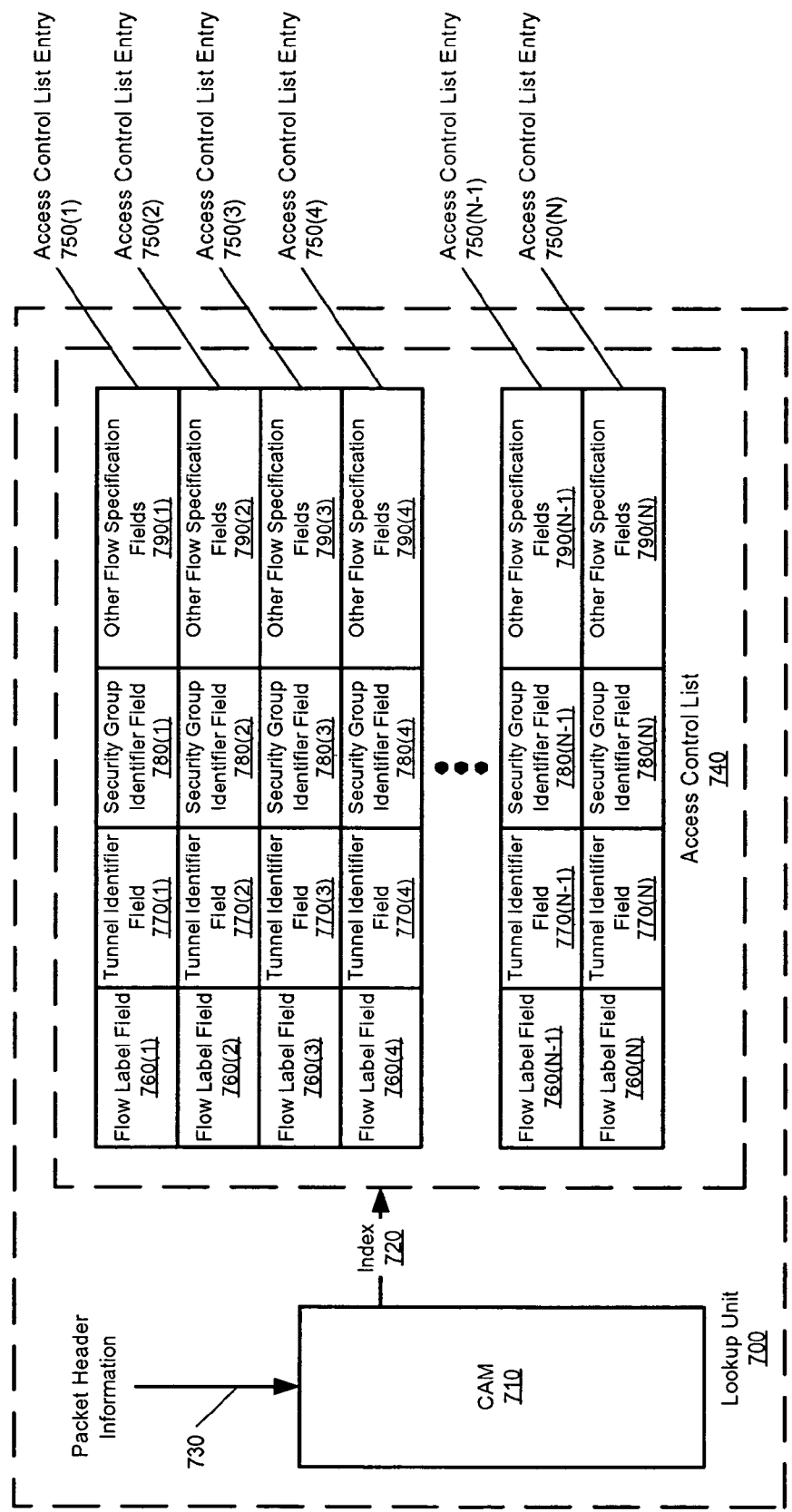
FIG. 7 is a block diagram illustrating a lookup unit according to embodiments of the present invention.

FIG. 7 is a block diagram illustrating a lookup unit 700 according to the present invention, which is an example of tunnel classification unit 460 of FIG. 4. Lookup unit 700 includes a content-addressable memory (CAM) 710, which generates an index 720 from packet header information 730. Index 720 is used to access an access control list 740. Access control list 740 includes a number of access control list entries (ACEs); access control list entries 750(1)-(N), each of which, in turn, include a flow label field (depicted in FIG. 7 as flow label fields 760(1)-(N)), a tunnel identifier field (depicted in FIG. 7 as tunnel identifier fields 770(1)-(N)), a security group identifier (SGI) (SGI fields 780(1)-N)), and other flow specifications fields (depicted in FIG. 7 as other flow specification fields 790(1)-(N)).

On ingress, packet header information (e.g., packet header information 730) is passed to CAM 710, which performs a lookup based on the packet header information provided. In the case of an ingress router (being from the perspective of the packet's point of origin, a client), the pertinent portion of packet header information 730 includes the packet's SGI (possibly among other information) to determine the tunnel to which the packet is to be forwarded (if, in fact, that is permissible). In this scenario, CAM 710 generates an index from this information (index 720), which is used to select the proper one of ACEs 750(1)-(N). In selecting the proper ACE, information in index 720 is compared to information in one or more of security group identifier fields 780(1)-(N). By doing so, a corresponding one of tunnel identifier fields 770(1)-(N) containing corresponding SGI information can be identified.

In a similar manner, on the egress side, packet header information 730 contains tunnel identification information (such as that depicted in FIG. 6 as IP header 610 and tunnel identifier 620). Again, packet header information 730 is provided to CAM 710, which, in turn, generates index 720, which is an index into access control list 740. In this case, however, index 720 contains information as to the identification of the tunnel on which the given packet was received. This information within index 720 is used to identify one (or more) of ACEs 750(1)-(N) using the information contained in tunnel identifier fields 770(1)-(N) containing a tunnel identifier matching that of the incoming packet (e.g., tunnel identifier 620). The tunnel identification information (e.g., tunnel identifier 620) and flow label information (e.g., IP header 610) are used to determine which of security group identifier fields 780(1)-(N) match, and thereby allow for the identification of the packet's security group identifier. CAM 710 thus uses this information to generate index 720, which, in turn, is used as an index into access control list 740 to identify the desired one of ACEs 750(1)-(N).

Note that the variable identifier "N" is used in several instances in FIG. 7 and in other of the figures described herein to more simply designate the final element of a series of related or similar elements. The repeated use of such variable identifiers is not meant to necessarily imply a correlation between the sizes of such series of elements, although such correlation may exist. The use of such variable identifiers does not require that each series of elements has the same number of elements as another series delimited by the same variable identifier. Rather, in each instance of use, the variable identified by "N" (or any other such identifier) may hold the same or a different value than other instances of the same variable identifier.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

An Example Process Supporting Tunneled Security Groups

Figure 8:
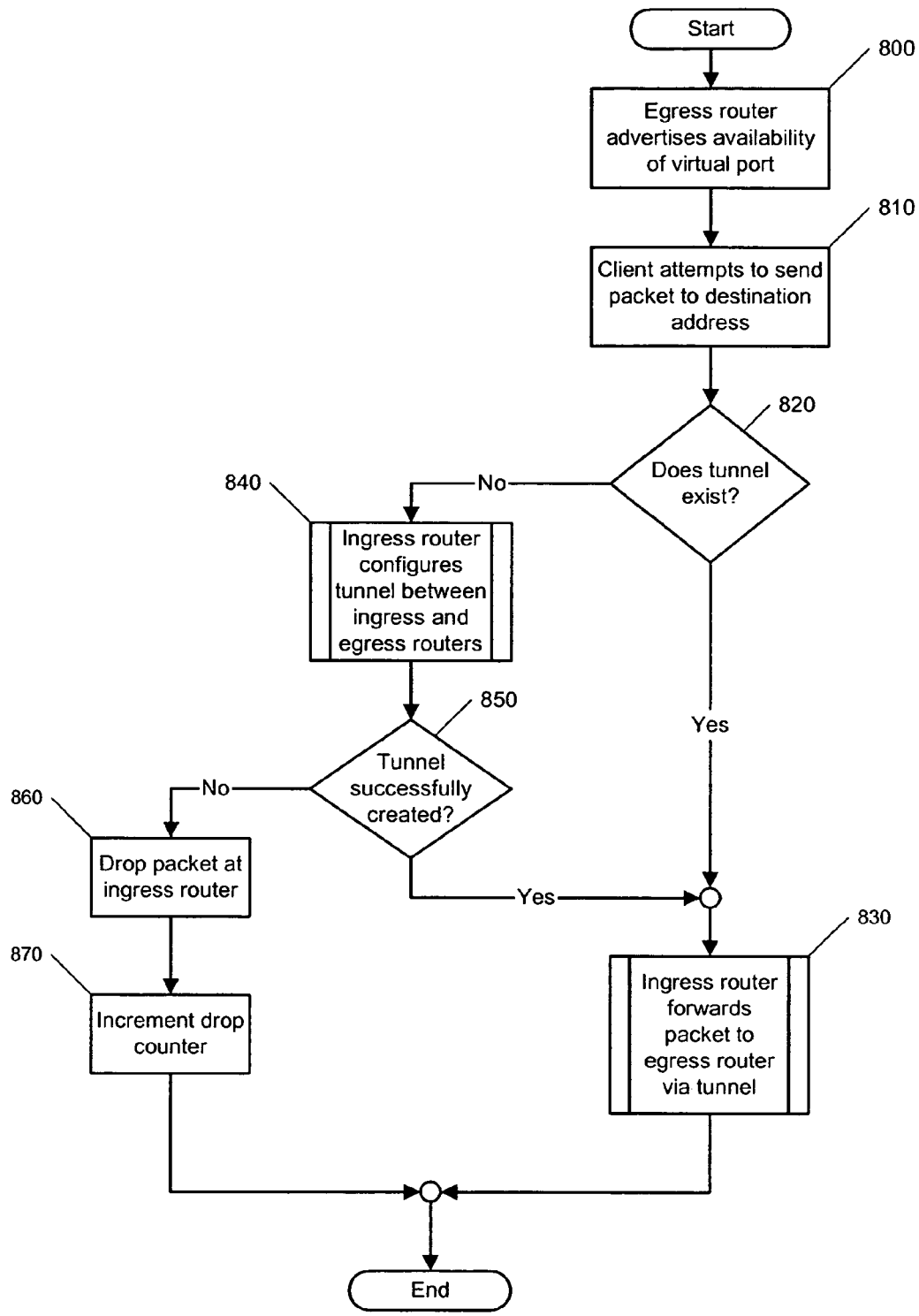
FIG. 8 flow diagram illustrating a process of forwarding a packet stream across a network according to embodiments of the present invention.

FIG. 8 is flow diagram illustrating a process of forwarding a packet stream across a network according to the present invention. The process begins with the given egress router advertising the availability of a given virtual port (step 800). In advertising the availability of a virtual port, the egress router also advertises the destination IP addresses (on the other side server side) of the egress router), and tunneling information (e.g., protocols employed and the like). This equates to the egress router indicating the availability of a destination for a given tunnel thereto. Next, a client attempts to send a packet to a destination address (step 810). In making such an attempt, a determination is made as to whether the desired tunnel exists (step 820). If the desired tunnel exists, the ingress router forwards the given packet(s) to the appropriate egress router via the given tunnel (step 830).

However, if a tunnel does not exist, the ingress router configures a tunnel between itself and the appropriate egress router, based on information obtained during the egress router (s) advertisement of virtual port availability (step 840). A determination is then made as to whether the creation of the desired tunnel was successful (step 850). If the tunnel was created successfully, the ingress router forwards the given packet(s) to the particular egress router via the tunnel between the two (step 830). However, if the tunnel was not created successfully, the packet is dropped at the ingress router (step 860) and a drop counter incremented (step 870). Such is the case where, for example, a given host is not allowed access to a given server due to the host's security group not being allowed to access a server of another security group. Note also that a failure in tunnel creation would be identified by the ingress router.

Note that a TSG device needs to be configurable in order to advertise the address blocks that are restricted to TSG access, using extensions to the intra-domain routing protocol. A TSG device updates its TCS in order to ensure packets addressed to such an address block are tunneled appropriately. It should also be noted that, in some implementations, tunneling may require two levels of encryption at the tunnel input to handle the tunnel encryption as well as any link-level encryption. These two levels can be implemented by recirculating the packet to effectively pass the packet through the transmission (and reception) logic twice: once to perform the tunnel encryption using the port-logic encryption and a second time to perform the next-hop link-level encryption. Similarly, on reception at a tunnel egress endpoint, the packet is link-level decrypted on ingress to the first pass and then tunnel-decrypted on ingress to the second pass. Using this recirculation approach, the TCS can be implemented as part of the same classification/forwarding mechanism used for untunneled packet processing. Using a recirculation-based implementation, one would expect that the "virtual output port" after the first recirculation in ingress would be used in the output ACL/QoS classification so that the packets going to a specific tunnel can be denied or policed the same as if they were going out a real port.

As noted, FIG. 8 (as well as the other flow diagrams discussed herein) depicts a flow diagram illustrating a process according to an embodiment of the present invention. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagram may be executed by a module (e.g., a software module) or a portion of a module or a computer system user. Thus, the above described method, the operations thereof and modules therefor may be executed on a computer system configured to execute the operations of the method and/or may be executed from computer-readable storage media. The method may be embodied in a machine-readable and/or computer-readable storage medium for configuring a computer system to execute the method. Thus, the software modules may be stored within a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable media. The computer readable media may be permanently, removably or remotely coupled to the computer system. The computer readable media may non-exclusively include, for example, any number of the following: magnetic storage media including disk and tape storage media. optical storage media such as compact disk media (e.g., CD-ROM, CD-R, etc.) and digital video disk storage media, nonvolatile memory storage memory including semiconductor-based memory units such as FLASH memory, EEPROM, EPROM, ROM or application specific integrated circuits, volatile storage media including registers, buffers or caches, main memory, RAM, and the like. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

Figure 9:
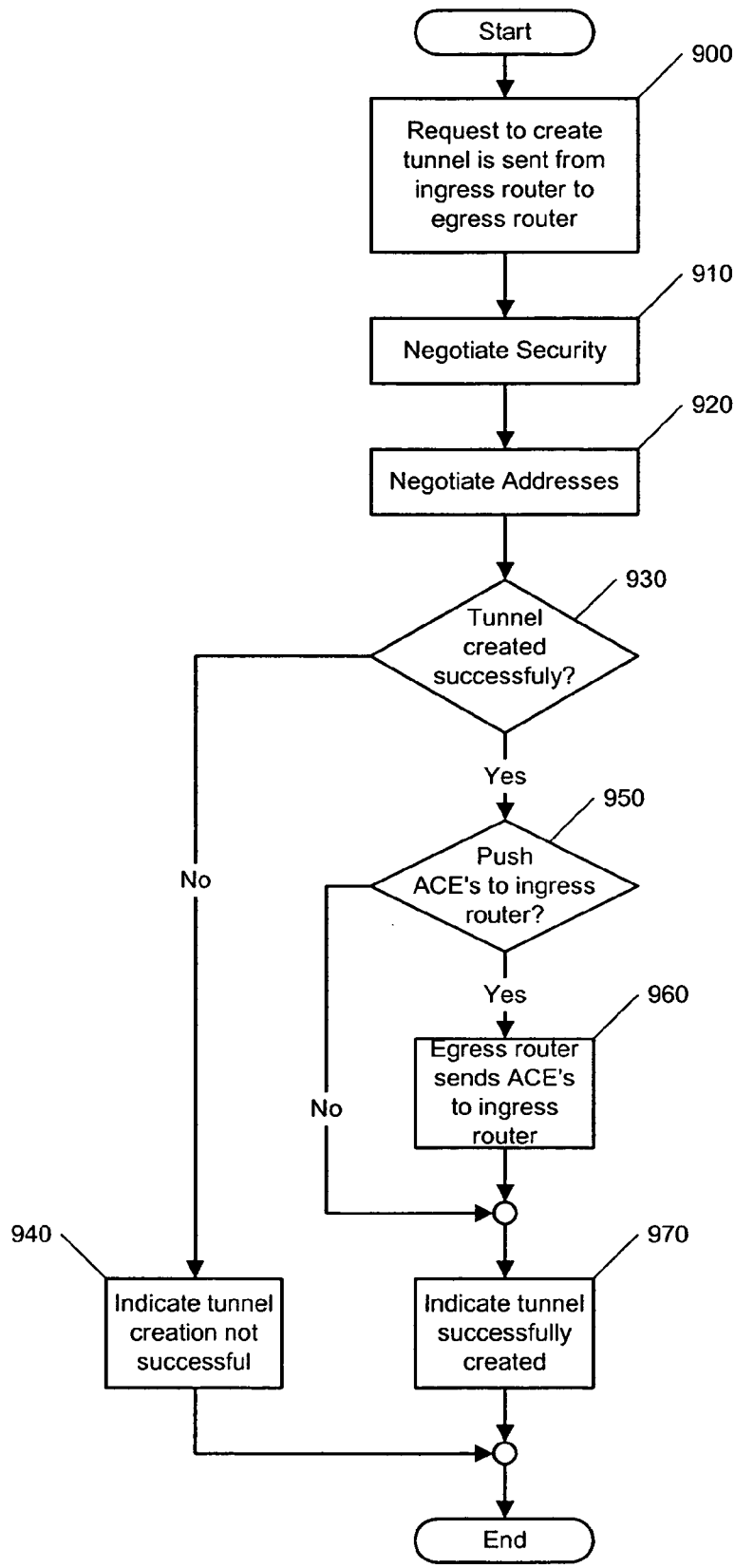
FIG. 9 is a flow diagram illustrating a process for creating a tunnel between an ingress router and an egress router according to embodiments of the present invention.

FIG. 9 is a flow diagram illustrating a process for creating a tunnel between an ingress router and a egress router (e.g., ingress router 555 and egress router 560) according to the present invention. The process begins with the ingress sending a request to create the tunnel to the egress router (step 900). Next, security is negotiated between the ingress router and egress router (step 910). Also negotiated are the network addresses to be supported by the tunnel (step 920). These addresses are used to determine, given the destination of the given network traffic, whether or not that traffic is to be conveyed by the tunnel.

A determination is then made as to whether the tunnel was created successfully between the ingress and egress routers (step 930). If the tunnel was not created successfully, the ingress router indicates this fact to the host requesting communications with the desired server (step 940). If the tunnel is successfully created, a determination is then made as to whether to push ACEs from the egress router to the ingress router (step 950). As will be appreciated from FIG. 7, an ACL can be viewed as a list of ACEs. In pushing ACEs to the ingress router, in order to accomplish this operation efficiently, only the ACEs that are applicable to the particular tunnel are sent to the ingress router, typically. This is because, for example, the full ACL may specify entries for a number of different security groups, some (or many) of which may not be appropriate (or necessary) to the given ingress router. However, because of the tunnel in question is only used for a particular security group, only the ACEs that reference that security group need be sent to the ingress router as a result of the particular tunnel's creation. While this is not mandatory, it is appreciated that more ACEs (up to and including the entire ACL) or fewer ACEs can be sent.

In pushing ACEs to an ingress router, a consideration is the fact that only certain ACEs are applicable to a particular tunnel, and thus, are the only ones that need to be sent. For instance, the full ACL may specify entries for K different security groups, but because a given tunnel (between a given ingress and egress router pair) is only used for a particular group, only the ACEs that reference that group are sensible to send to the ingress router on the particular tunnel's creation.

The determination as to whether or not to push ACEs to the ingress router is fundamentally a decision as to which of the ingress and egress routers is to performed packet analysis on a given tunnel's network traffic. If the ingress router is to perform this analysis, the determination is made that the egress router must push the requisite ACEs to the ingress router, and this operation is performed (step 960). Note that, if the egress router is to perform this analysis, ACEs are not pushed to the ingress router (step 950), and so the step of the egress router sending ACEs to the ingress router is not performed. After the determination is made as to whether to push ACEs to the ingress router (and that operation accomplished, if so desired) the ingress router indicates that the tunnel was successfully created (step 970).

Figure 10:
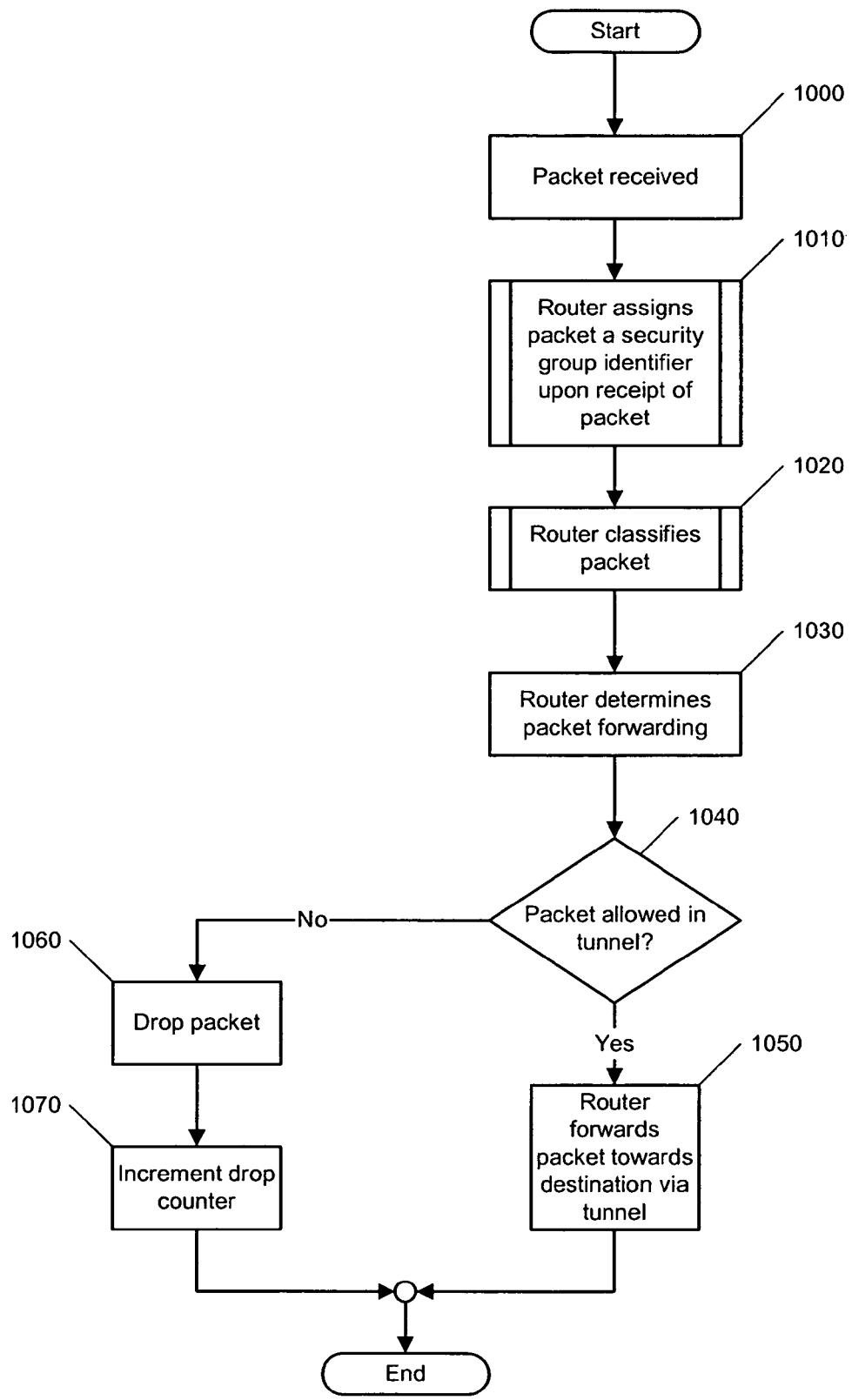
FIG. 10 is a flow diagram illustrating a process for forwarding a packet using a tunnel according to embodiments of the present invention.

FIG. 10 is a flow diagram illustrating a process for forwarding a packet using a tunnel according the embodiments of the present invention. The process begins with the receipt of a packet (step 1000), which can be from a tunnel, or directly from a port. Next, the router receiving the packet assigns the packet a security group identifier (SGI) upon that packet's receipt (step 1010). Based on this security group identifier, the router then classifies the packet using the packet's SGI (step 1020). This classification can be performed at layer 2 or layer 3. The router then determines how the packet is to be forwarded (step 1030). This includes identifying the tunnel through which the packet is to be forwarded. A determination is then made as to whether or not the packet is allowed through the tunnel in question (step 1040). If the packet is allowed in its designated tunnel, the router forwards that packet towards its destination via the given tunnel (step 1050). However, if the packet is not allowed in the tunnel, the packet is dropped (step 1060) and a drop counter incremented (step 1070).

Figure 11:
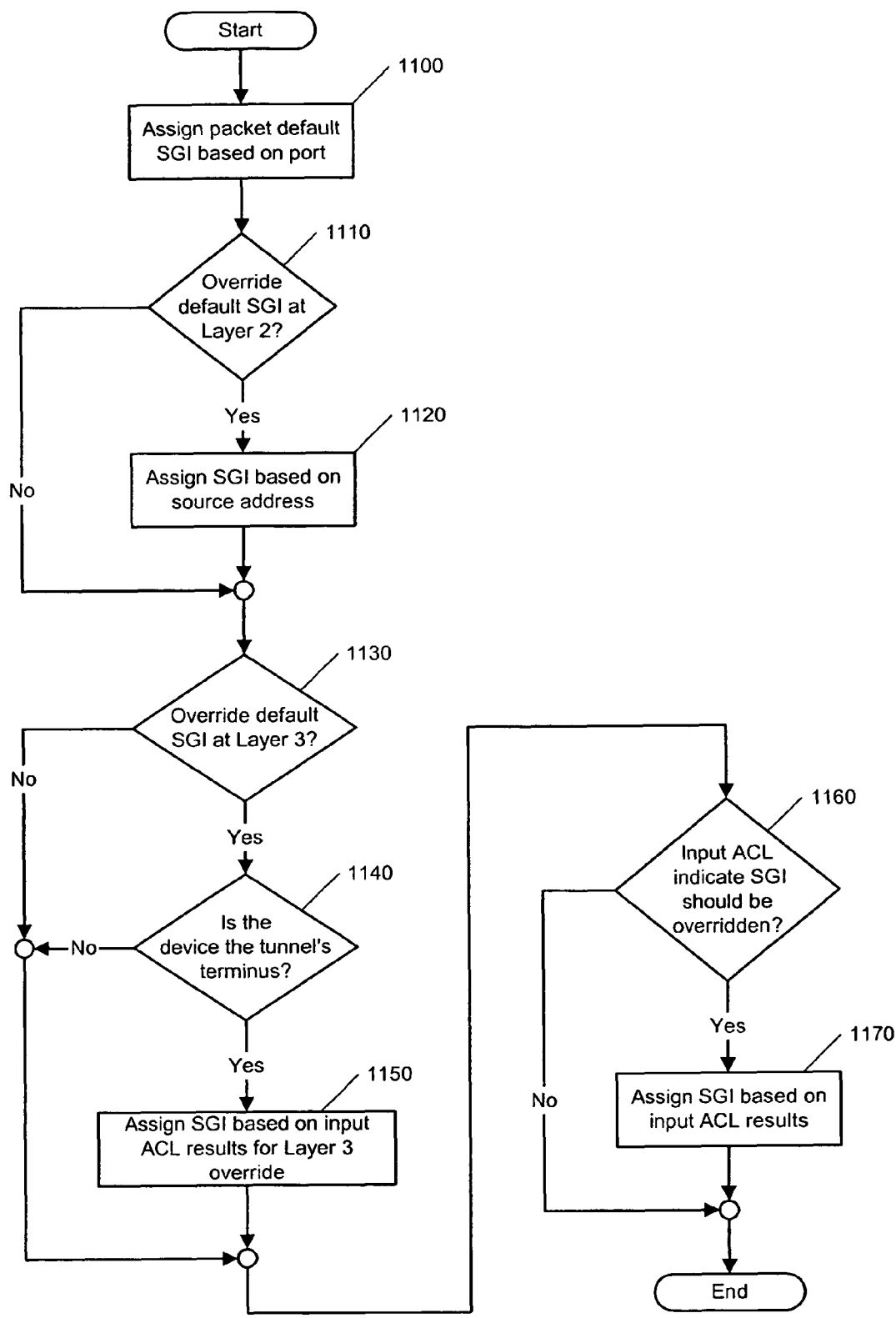
FIG. 11 is a flow diagram illustrating the assignment of a security group identifier (SGI) to a packet according to embodiments of the present invention.

FIG. 11 is a flow diagram illustrating the determination of a security group identifier (SGI) for a packet received by a network device (e.g., a router) according to embodiments of the present invention. As an initial matter, it is to be understood that the process of FIG. 11 is merely an example, and that such an SGI can be reassigned at any point in the given packet classification process (even at each such point). Typically, however, such reassignment occurs only once.

The process of FIG. 11 begins with the assignment of a default SGI to the packet, which is based on the port on which the packet is received (step 1100). A determination is then made as to whether or not to override the default SGI at layer 2 (step 1110). If the default SGI is to be overridden at layer 2, the packet is assigned an SGI based on its source address (1120). A determination is made as to whether the default SGI (or the assigned layer 2 SGI) is to be overridden at layer 3 (step 1130). If the default SGI (or assigned layer 2 SGI) is to be overridden at layer 3, a determination is made as to whether the given network device performing the analysis is, in fact, the tunnel's terminus (step 1140). If the network device is the tunnel's terminus, the packet's SGI is overridden at layer 3. Typically, this is accomplished by assigning the packet an SGI based on the results of a lookup performed using the network device's input ACL (step 1150), rather than overriding the packet's SGI at layer 3 in a separate operation. Note that this is the case when an input ACL indicates the tunnel on which the packet is arriving, although other mechanisms can be employed to identify the tunnel associated with a packet upon reception. A determination is then made as to whether the default SGI (or the assigned SGI) is to be overridden, as indicated by the input ACL (step 1160). If the ACL indicates that the default (or assigned) SGI is to be overridden, the packet's SGI is assigned based on the applicable input ACL entries (step 1170).

This process allows such processing to occur at the input of the tunnel. Typically, the host is associated with an SGI using either the assigned MAC address or assigned IP address. Thus, a packet from the host is mapped to a corresponding SGI using either MAC or source IP address, the latter typically using the input parameters. This SGI, together with the destination IP address, determine the tunnel through which the packet should pass, with egress into the tunnel controlled by the output ACLs associated with the tunnel endpoint as a logical egress port. On reception from a tunnel, the same sequence occurs, except this is being applied to the encapsulating header to provide the SGI associated with the tunnel. The packet then needs to be de-encapsulated and forwarded based on the original packet header and the given SGI, and so, typically, the tunnel encapsulation header is removed at this stage.

Note that, when tunneled packets require recirculation (e.g., for encryption and decryption), such packets require twice the router bandwidth as a normal packet. Thus, blocking unallowed packets before such packets are egressed to a tunnel (and so, recirculated at the ingress router) can be important to protect against flooding attacks.

Figure 12:
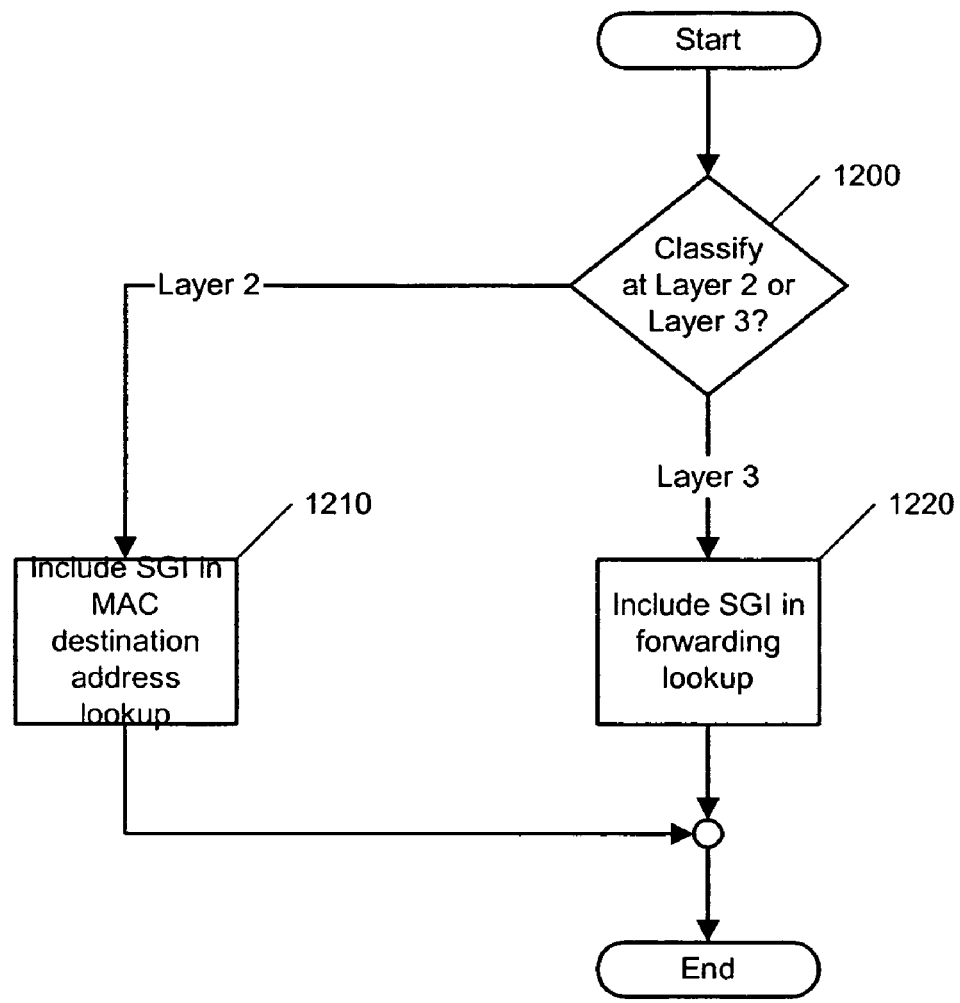
FIG. 12 is a flow diagram illustrating the classification of a packet according to embodiments of the present invention.

FIG. 12 is a flow diagram illustrating the classification of a packet based on a determination as to the networking layer at which the packet is to be classified, according to the present invention. The process begins with a determination as to the whether the packet is to be classified at network layer 2 or network layer 3 (step 1200). If the packet is to be classified at network layer 2, the SGI is included in the media access control (MAC) layer destination address lookup (step 1210). Alternatively, if the packet is to be classified at network layer 3, the SGI is included in the forwarding lookup (step 1220). Note that the operations depicted in FIG. 12 are merely examples, and that SGIs and their related mechanisms are not tied to a particular packet classification mechanism or methodology. SGIs can be employed in a variety of classification mechanisms, including input ACLs and output ACLs, as well as forwarding mechanisms. Moreover, ACLs can be applied to layer 2 (L2) packets (e.g., VLAN ACLs), and so allow this classification to be performed on IP packets.

As noted, the present invention provides a number of advantages, including improved network efficiency (both in terms of resources required and operation), improved security and compatibility with existing standards and equipment. With regard to efficiency, a TSG according to the present invention enjoys a reduction in the number of ACLs required to provide logical group access control. The present invention also reduces the need to update ACLs, while providing the advantages of role- and group-based access control. Furthermore, with the extension to propagate ACLs from egress device to ingress device on tunnel setup, the present invention reduces network resource consumption, particularly with regard to protection from a potential denial-of-service attack.

With regard to security, the present invention employs tunnels that can be encrypted using standard techniques and protocols, providing "edge-to-edge" security on the identification of packets to groups and secure propagation of group-based ACLs. The present invention is also readily compatible with existing standards. A TSG according to the present invention supports logical security groups without introducing a new packet header format, thereby avoiding the problems associated with the standardization of new packet formats and the deployment of switches/routers supporting such new formats. Logically, a tunnel is used to effectively carry the identifier of the sender's security group from the ingress endpoint of the tunnel to the egress endpoint of the tunnel for use in classification at this egress endpoint, effectively (and securely) providing role-based ACLs. Consequently, TSGs can be deployed incrementally by upgrading the edge devices to provide TSG support.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Moreover, while the invention has been particularly shown and described with reference to these specific embodiments, it will be understood by those skilled in the art that the foregoing and other changes in the form and details may be made therein without departing from the spirit or scope of the invention.

What is claimed is:

1. A network device comprising:
a processor;
a first memory, wherein
said processor and said first memory are coupled to one another,
said processor is configured to dynamically set up a tunnel comprising detecting that no tunnel exists between a first ingress router and an egress router specified by a packet, and
said processor is configured to create the tunnel in response to the detecting, wherein
all network traffic received via the tunnel is associated with the security group;
a tunnel classification stage, wherein
said processor is coupled to control said tunnel classification stage,
said tunnel classification stage comprises
a packet processing section comprising at least one processor,
a security group identifier identification unit, coupled to said packet processing section, and
a tunnel classification unit, coupled to said packet processing section and said security group identifier identification unit,
said security group identifier is configured to identify a security group of a sender of said packet,
said security group comprises a plurality of senders,
said plurality of senders comprises said sender, and
said packet processing section is configured to
classify said packet, wherein
said classifying comprises selecting a network layer of a plurality of network layers at which said packet is to be classified, and
said classifying is based, at least in part, on a destination of said packet and a security group identifier (SGI) assigned to said packet,
said SGI identifies a security group of a sender of said packet, determine a routing of said packet based on a result of said classifying, wherein
said packet processing section is configured to determine said routing by virtue of being configured to identify a tunnel using said destination address;
identifying a tunnel identifier of said tunnel based on said routing of said packet, wherein said tunnel identifier uniquely identifies said runnel; determine whether forwarding said packet via said runnel is permitted, wherein
said packet processing section is configured to determine whether said forwarding is permitted based, by selecting an entry of an access control list (ACL) using at least said SGI and said tunnel identifier, and
forward said packet via said tunnel, if said forwarding said packet via said tunnel is permitted.

2. The network device of claim 1, wherein
said packet processing section is further configured to forward said packet through said tunnel based, at least in part, on information in a header of said packet.

3. The network device of claim 1, wherein a single router comprises said tunnel classification stage.

4. The network device of claim 3, wherein said tunnel classification unit comprises:
a lookup unit.

5. The network device of claim 4, wherein said lookup unit comprises:
said access control list; and
a content-addressable memory, wherein
said content-addressable memory is configured to access said ACL by virtue of being configured to generate an index, and
provide said index to said ACL.

6. The network device of claim 5, wherein
said network device further comprises a memory,
said ACL is stored in said memory,
said content-addressable memory and said memory are coupled to one another,
said ACL comprises a plurality of ACL entries (ACEs), and
each of said ACEs comprises a tunnel identifier field and a security group identifier field.

7. A method comprising:
dynamically setting up a tunnel comprising detecting that no tunnel exists between a first ingress router and an egress router specified by a packet;
creating the tunnel in response to the detecting, wherein all network traffic received via the tunnel is associated with the security group;
assigning a security group identifier (SGI) to said packet, wherein
said SGI is assigned based, at least in part, on a security group of a sender of said packet,
said SGI identifies said security group,
said security group comprises a plurality of senders, and
said plurality of senders comprises said sender;
classifying said packet, wherein
said classifying comprises selecting a network layer of a plurality of network layers at which said packet is to be classified, and
said classifying is based, at least in part, on a destination of said packet and said SGI;
determining a routing of said packet based on a result of said classifying, wherein said determining said routing comprises identifying a tunnel using said destination address;
identifying a tunnel identifier of said tunnel based on said routing of said packet, wherein
said tunnel identifier uniquely identifies said tunnel;
determining whether forwarding said packet via said tunnel is permitted, wherein said determining whether said forwarding is permitted comprises selecting an entry of an access control list (ACL) using at least said SGI and said tunnel identifier; and forwarding said packet via said tunnel, if said forwarding of said packet via said tunnel is permitted.

8. The method of claim 7, wherein
said determining whether said forwarding is permitted is based, at least in part, on a result of said classifying of said packet.

9. The method of claim 8, wherein said determining whether said forwarding is permitted comprises:
generating an index, wherein said index is based on said SGI and said tunnel identifier; and
using said index to access said access control list, wherein said ACL includes information as to whether said packet can be sent via said tunnel.

10. The method of claim 9, wherein said information comprises:
an SGI field; and
a tunnel identifier field.

11. The method of claim 7, wherein
said forwarding said packet comprises forwarding said packet from said first ingress router to said egress router via said tunnel.

12. The method of claim 11, further comprising:
receiving said packet at said egress router; and
determining whether said packet can be forwarded by said egress router based on said SGI.

13. The method of claim 12, wherein said determining whether said packet can be forwarded by said egress router further comprises:
determining whether said packet can be forwarded by said egress router based, at least in part, on said SGI, said destination of said packet, and said tunnel identifier of said tunnel.

14. The method of claim 12, wherein said determining whether said packet can be forwarded by said egress router further comprises:
generating an index into an access control list (ACL), wherein
said ACL comprises information regarding whether said packet can be forwarded by said egress router, and
said index includes said tunnel identifier of said tunnel; and
accessing said ACL using said index.

15. The method of claim 7, further comprising:
pushing a set of access control entries from said egress router associated with the tunnel to said first ingress router associated with the tunnel, wherein
said pushing is performed in response to detecting creation of the tunnel, and
said set comprises only access control entries corresponding to the tunnel.

16. The method of claim 7 further comprising:
encrypting the packet at multiple levels, wherein
the encrypting comprises recirculating the packet.

17. The method of claim 7, wherein
said classifying comprises specifying whether the SGI is included in a MAC layer lookup or a forwarding lookup.

18. A computer system comprising:
a processor;
a non-transitory computer readable storage medium coupled to said processor; and
computer code, encoded in said non-transitory computer readable storage medium, configured to cause said processor to:
dynamically set UP a tunnel comprising detecting that no tunnel exists between a first ingress router and an egress router specified by a packet,
wherein all network traffic received via the tunnel is associated with a security group;
assign a security group identifier (SGI) to said packet,
wherein said SGI is assigned based, at least in part, on a security group of a sender of said packet,
said SGI identifies said security group, said security group comprises a plurality of senders, and
said plurality of senders comprises said sender;
generate a classification of said packet by virtue of being configured to classify said packet,
wherein classifying said packet comprises selecting a network layer of a plurality of network layers at which said packet is to be classified, and classifying said packet is based, at least in part, on a destination of said packet and said SGI;
determine a routing of said packet based on a result of said classifying, wherein determining said routing comprises identifying a tunnel using said destination address;
identify a tunnel identifier of said tunnel based on routing of said packet, wherein said tunnel identifier uniquely identifies said tunnel;
determine whether said packet can be sent via a tunnel by selecting an entry of an access control list (ACL) using at least said SGI and said tunnel identifier: and
forward said packet via said tunnel, if said forwarding said packet via said tunnel is permitted.

19. The computer system of claim 18, wherein said computer code configured to cause said processor to determine whether said packet can be sent via said tunnel is further configured to cause said processor to:
generate an index, wherein said index comprises said SGI; and
use said index to access said access control list, wherein said ACL includes information as to whether said packet can be sent via said tunnel.

20. The computer system of claim 19, wherein said information comprises:
an SGI field; and
a tunnel identifier field.

21. The computer system of claim 18, wherein said forwarding said packet comprises forwarding said packet from said first ingress router to egress router via said tunnel.

22. The computer system of claim 21, wherein said computer code is further configured to cause said processor to:
receive said packet at said egress router; and
determine whether said packet can be forwarded by said egress router based on said SGI.

23. The computer system of claim 22, wherein said computer code configured to cause said processor to determine whether said packet can be forwarded by said egress router is further configured to cause said processor to:
determine whether said packet can be forwarded by said egress router based, at least in part, on said SGI, a destination of said packet, and said tunnel identifier of said tunnel.

24. The computer system of claim 22, wherein said computer code configured to cause said processor to determine whether said packet can be forwarded by said egress router is further configured to cause said processor to:
generate an index into said access control list, wherein
said ACL comprises information regarding whether said packet can be forwarded by said egress router, and said index includes said tunnel identifier of said tunnel; and access said ACL using said index.

25. A computer program product, wherein said computer program product comprises a non-transitory computer-readable storage medium, and further comprising:

a plurality of instructions, comprising a first set of instructions, executable on a computer system, configured to dynamically setting UP a tunnel comprising detecting that no tunnel exists between a first ingress router and an egress router specified by a packet; and creating the tunnel in response to the detecting, wherein all network traffic received via the tunnel is associated with the security group, a second set of instructions, executable on a computer system, configured to assign a security group identifier (SGI) to said packet, wherein said first set of instructions are further configured to assign said SGI based, at least in part, on a security group of a sender of said packet, said SGI identifies said security group, said security group comprises a plurality of senders, and said plurality of senders comprises said sender, a third set of instructions, executable on said computer system, configured to classify said packet, wherein classifying said packet comprises selecting a network layer of a plurality of network layers at which said packet is to be classified, and classifying said packet is based, at least in part, on a destination of said packet and said SGI, a fourth set of instructions, executable on said computer system, configured to determine a routing of said packet based on a result of said classifying, wherein said determining said routing comprises identifying a tunnel using said destination address, said third set of instructions configured to identify a tunnel identifier of said tunnel based on said routing of said packet, wherein said tunnel identifier uniquely identifies said tunnel;

a fifth set of instructions, executable on said computer system, configured to determine whether forwarding said packet via said tunnel is permitted, wherein said fourth set of instructions is further configured to select an entry of an access control list (ACL) using at least said SGI and said tunnel identifier, and a six set of instructions, executable on said computer system, configured to forward said packet via said tunnel, if said forwarding said packet via said tunnel is permitted; and said computer-readable storage medium, wherein said instructions are encoded in said computer-readable storage medium.

26. The computer program product of claim 25, wherein said second set of instructions is further configured to generate a classification of said packet, and said fourth set of instructions are further configured to use said classification.

27. The computer program product of claim 26, wherein said fourth set of instructions comprises:

a first subset of instructions, executable on said computer system, configured to generate an index, wherein said index is based on said SGI and said tunnel identifier; and a second subset of instructions, executable on said computer system, configured to use said index to access said access control list (ACL), wherein said ACL includes information as to whether said packet can be sent via a tunnel.

28. The computer program product of claim 27, wherein said information comprises:

an SGI field; and a tunnel identifier field.

29. The computer program product of claim 25, wherein said fifth set of instructions are further configured to forward said packet from said first ingress router to said egress router via said tunnel.

30. The computer program product of claim 29, further comprising:

a sixth set of instructions, executable on said computer system, configured to receive said packet at said egress router; and a seventh set of instructions, executable on said computer system, configured to determine whether said packet can be forwarded by said egress router based on said SGI.

31. The computer program product of claim 30, wherein said seventh set of instructions comprises:

a first subset of instructions, executable on said computer system, configured to determine whether said packet can be forwarded by said egress router based, at least in part, on said SGI, said destination of said packet, and said tunnel identifier of said tunnel.

32. The computer program product of claim 30, wherein said seventh set of instructions comprises:

a first subset of instructions, executable on said computer system, configured to generate an index into said access control list, wherein said ACL comprises information regarding whether said packet can be forwarded by said egress router, and said index is based on said SGI and said tunnel identifier of said tunnel; and a second subset of instructions, executable on said computer system, configured to access said ACL using said index.

* * * * *